Sept. 7, 1937.    F. KNOOP    2,091,995
HARDNESS TESTING DEVICE

Filed Dec. 23, 1936

INVENTOR
Frederick Knoop
BY
ATTORNEY

Patented Sept. 7, 1937

2,091,995

UNITED STATES PATENT OFFICE 2,091,995

HARDNESS TESTING DEVICE

Frederick Knoop, Washington, D. C., assignor to The Government of the United States, represented by the Secretary of Commerce Application December 23, 1936, Serial No. 117,330

5 Claims. (Cl. 265—12)

(Granted under the act of March 3, 1883, as amended April 30, 1928; 370 O. G. 757)

The invention described may be manufactured and used by or for the Government for governmental purposes without the payment to me of any royalty thereon.

This invention relates to improved means including an indentation tool for testing the relative hardness, elasticity and plasticity of materials and has for its object to provide such a means that will produce a relatively large impression in the material to be tested, when penetrated by an indentation tool under a relatively light load, the area of the impression to include a greater source of reliable reference points for accuracy of resistance measurements.

Heretofore it has been the conventional practice to test the relative hardness of such resistant material as steel, by inflicting a blow of predetermined magnitude on the surface of a sample, measuring the degree of resultant impression and comparing the same to some standard material previously subjected to the same treatment under the same conditions. The penetrating member is usually a suitably supported diamond point. This diamond point is in the shape of a four sided pyramid, the four cutting edges of which are relatively short and equal in length and the resultant impression is an area in the form of a square. A comparatively large load must be imposed to bring about an adequate penetration whereby the impressions of the cutting edges and the four sides will be long and large enough for measurement purposes. This obviously calls for an appreciable penetration which, in turn, calls for an appreciable displacement and distortion. For resistance measurement purposes, this makes for lesser accuracy, as the area of penetration and the length of the impressions made by the cutting edges are the important reference points and not the depth of the penetration. Moreover, if the specimen is elastic the impression diminishes between the time it is made and the time it is microscopically observed. Inasmuch as the four cutting edge impressions are equal there is no adequate means of determining the length of the same or the area of the impression at the time it was made. Hence the measurement is based on an area which does not truly represent the hardness, plasticity or elasticity of the specimen being tested.

Moreover, the conventional hardness testing device is not suitable for testing the hardness of glass, tooth enamel, chromium electro plating etc. To test such materials requires the test to be made on thicknesses less than .002". A light load is therefore imperative and the indentation tool must be so shaped as to produce the maximum measuring distances in its impression in length and width for small differences in depth of penetration. The lightest loads obtainable by the conventional devices are not less than 10 kilograms, and to use such a device for testing the hardness of a thin film of tooth enamel or plating the thickness of which is of the order of .002" would amount not to a test of the thin film but rather a test of the structure well below the surface.

It is therefore one of the objects of this invention to provide an improved diamond point whereby it will be possible to accurately test the relative hardness, not only steel and similar materials, but also of very thin electro-plating deposits of chromium, tooth enamel, and the like and whereby it will be possible to obtain a greater measurable length of impressed cutting edge and area in the sample produced by a lesser impact, the resulting impression being in varying proportions other than unity, whereby a comparison of the length to width will provide a means for determining the dimensions of the impression as it originally actually existed so that the microscopic examination is made readily and accurately.

To this end it is proposed primarily to provide an elongated symmetrical four sided pyramidical diamond point. This diamond point, as will be later explained, may have four or more cutting edges, the fact remaining that two transverse ones may be equal in length and are considerably shorter in length than the two elongated longitudinal ones which may be equal to each other. Thus a small increase in depth of impression provides a great difference in length of the longitudinal edges with respect to the others, including the transverse ones. The relationship of the altitude of the pyramid diamond point to the length of the elongated longitudinal cutting edges determines the sensitivity of measurement. The contraction of the impression area will be the greatest proportionally along the transverse cutting edges and the least at the outer extremities of the elongated longitudinal edges approaching zero. Thus the variance in length of impression is negligible. The length is therefore measured and with this, in addition to the dimensions of the diamond indentation tool, as known quantities, the area of the impression as it was actually originally made is readily determined simply by the simple microscopically measured length of the combined elongated longitudinal cutting edges.

With the foregoing and other objects in view, the invention consists in the combination of parts and in the details of construction hereinafter set forth in the following specification and appended claims, certain embodiments thereof being illustrated in the accompanying drawing, in which:

Figure 1:
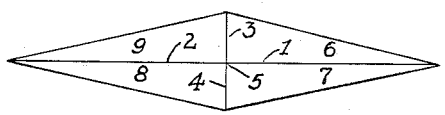
Figure 1 is a top plan enlarged diagrammatical view of one form of diamond point in which there are four equal sides with two elongated equal cutting edges and two equal relatively short cutting edges.
Figure 2:
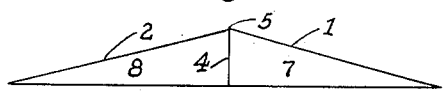
Figure 2 is a side view of that shown in Figure 1.

Referring more particularly to the drawing, Figures 1 and 2 show one form of four sided pyramidical diamond accurately cut to have two equal length elongated cutting edges 1 and 2 and two equal length relatively short transverse cutting edges 3 and 4, radiating from the peak 5, leaving the four sides 6, 7, 8, and 9 of equal area.

Figure 7:
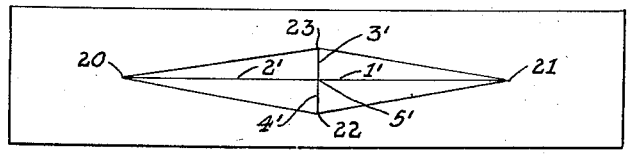
Figure 7 is a diagrammatical enlarged plan view of the specimen and the impression made therein by the tool.

When a specimen 18 to be tested for its hardness is subjected, by means later to be described, to contact with the diamond under a predetermined pressure, an impression is made in the specimen by the penetration of the diamond through the surface thereof. Due to the shape of the diamond this impression is correspondingly elongated as shown in Figure 7. The proportions of elongation may be altered by changing the relationship of the edges 1 and 2 with respect to the edges 3 and 4. A predetermined height of the peak with respect to the base 19 of the four sided pyramid indentation establishes the relationship of the depth of penetration to the length of the impression. In Figure 7 the length of the impression is the sum of the two long edge impressions 1' and 2' made by edges 1 and 2 and is measured from point 20 through the peak impression 5' to 21. The width of the observed impression is the sum of the short edge impressions 3' and 4' measured from point 22 through the peak impression 5' to point 23. The area of the impression is the enclosure bound by lines joining points 20, 21, 22, and 23.

By means of these relationships a highly efficient indentation tool is provided, in that the ratio of the short edges 3 and 4 to the long edges 1 and 2 determines the degree of visibility across the ends of the long edge impressions 1' and 2' when the impression is microscopically observed, so that the relationship of the altitude of the diamond to the length of the long edges 1 and 2 determines the sensitivity of measurement obtainable.

The greatest relative displacement in the specimen penetrated by any diamond point is the area adjoining the peak of the diamond as this is the center of the impressed load. If the specimen is plastic the impression may have an area equal to the angles of the diamond point between the time the impression is made and when it is microscopically observed and measured. Likewise if the specimen is elastic the impression will correspondingly diminish. This reduction in area of the impression is most pronounced adjacent the center of the impressed load or in the region adjoining the impression of the diamond peak. The conventional diamond point would be one that would have four equal edges of the nature of those shown at 3 and 4. In order to obtain any great length or area of impression an appreciably great load would have to be imposed on the diamond. Even then the entire area of the impression would be adjacent the center of the impressed load and the plasticity or elasticity of the specimen would cause the entire impression to change accordingly. The percentage of observation error in micrometer measurement with a microscope is a distinct factor which affects the accuracy of measurement and here practically the entire impression when observed is at wide variance in dimensions to the impression actually made as a result of the imposed load. Measuring small differences increases the percentage of error.

The use of this diamond point indentation tool makes only a light load application necessary and provides for a sensitive means of measurement of small differences in the physical state or hardness on the surface of a material. Furthermore, due to the fact that only a light load is necessary in order to produce an impression, there is relatively less depth of penetration and consequently less error introduced by reason of the plasticity or elasticity of the specimen. Thus there is provided a method of measurement in which observation errors are reduced to a small value. The impression is of elongated shape in which great differences in micrometer microscope measurement determine small differences in the area of indentation mark. The large increase of area with small increase of load obtained in impressions made with this indentation diamond tool provides a more accurate determination of loads in kilograms per square millimeter. The large increase of area with small increase of load reduces the uncertainties of loads and areas to a minimum. These results may be expressed in hardness numbers of other testing machines.

Microscopical observations and measurements of impressions made with this diamond point indentation tool on non-elastic or plastic materials show that resulting angles of elongated diamond shaped impression correspond to angles of the diamond point. Examination of the elongated diamond shaped impression by a microscope shows slightly elevated ridges at the widest portion of the impression, where the load is greatest and from which they gradually diminish and substantially disappear entirely at the ends 20 and 21 of the long diagonal or cutting edge impressions 1' and 2'. These protruding ridges are the result of load application and are most pronounced at the point 5 of the indentation diamond, where the greatest amount of material is displaced and where it is not contemplated to make any measurements. A measurement is made of the length of the impression or across the ends 20 through the peak impression 5' and 21 of the long diagonal, where the edges 1 and 2 of diamond terminates the impression with practically no load having been imposed at these remote extremities 20 and 21. These extremities are visible but are so shallow and imposed by such a light load that the contraction in length is negligible whereas the width between points 22 and 23 and consequently the area of the impression may appreciably diminish between the application of the load and the time of observation and measurement. Knowing the dimensions of the diamond it is then only necessary to measure the length between the observed points 20 through the peak impression 5' and 21 to determine the width and area of the impression as it existed when the load was imposed. The result is an accurate desired measurement of the hardness, plasticity or elasticity of the specimen being tested.

Figure 3:
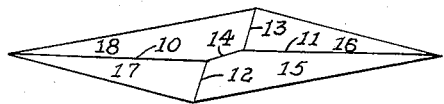
Figure 3 is a top plan enlarged diagrammatical view of a modified form of diamond point having two equal staggered short transverse cutting edges, two equal long, longitudinal cutting edges joined by a relatively short angular cutting edge and four sides the adjacent of which are unequal in area but the opposites of which are equal.
Figure 4:
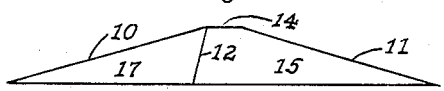
Figure 4 is a side view of that shown in Figure 3.
Figure 5:
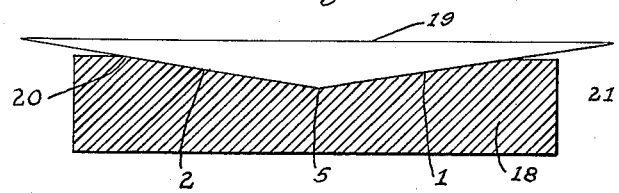
Figure 5 is an enlarged view in longitudinal sectional, diagrammatically shown, through a specimen and the indentation tool penetrating the same.
Figure 6:
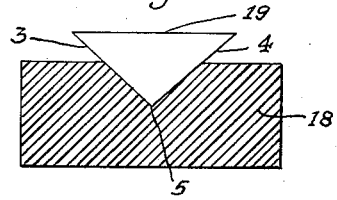
Figure 6 is a transverse section of the same as shown in Figure 5.

As previously mentioned the dimensions and shape of the diamond may be varied for different purposes, bearing in mind that the cutting edges or the diagonals of the diamond pyramid base should be of unequal length or in a proportion other than unity. As shown in Figures 3 and 4 the diamond is accurately cut to comprise the elongated longitudinal staggered cutting edges 10 and 11 which may be spaced and joined by a relatively short diagonally extending longitudinal edge 14, leaving the short transverse edges 12 and 13 staggered. The four sides, 15, 16, 17, and 18 terminate in such a manner as to produce the five cutting edges mentioned. The adjacent sides 17 and 18 are unequal and the same is true of sides 15 and 16, whereas sides 15 and 18 are equal and sides 16 and 17 are equal. The fifth cutting edge 14 is the first to penetrate the specimen as is the case of the peak 5 in the form shown in Figures 1 and 2. The advantage of this type of diamond is the resulting added reference of the fifth edge 14 over the peak 5 and the elongation of the combined edges 10, 11, and 14. This aids in centering the diamond in its holder with respect to the surface of the specimen.

I claim:

1. A diamond indentation tool for determining the relative hardness of a specimen, said diamond being substantially in the form of a pyramid with four sides and four or more cutting edges and elongated so that two of the cutting edges are of appreciably greater length than the remaining ones.

2. A diamond indentation tool for determining the relative hardness of a specimen, said diamond being substantially in the form of a pyramid with four sides and four or more cutting edges and elongated so that two of the cutting edges are of appreciably greater length than the remaining ones, the opposite sides being substantially equal.

3. A diamond indentation tool for determining the relative hardness of a specimen, said diamond being substantially in the form of a pyramid with four sides and four or more cutting edges and elongated so that two of the cutting edges are of appreciably greater length than the remaining ones, the adjacent sides being substantially equal.

4. A diamond indentation tool for determining the relative hardness of a specimen, said diamond being substantially in the form of a pyramid with four sides and four or more cutting edges and elongated so that two of the cutting edges are of appreciably greater length than the remaining ones, all of said sides and the opposite angles described by the cutting edge with the peak of the diamond being substantially equal.

5. A diamond indentation tool for determining the relative hardness of a specimen, said diamond being substantially in the form of a pyramid with four sides and four or more cutting edges and elongated so that two of the cutting edges are of appreciably greater length than the remaining ones, said cutting edges comprising two relatively short transverse ones and two spaced relatively long longitudinal ones joined by a relatively short diagonally extending fifth cutting edge.

FREDERICK KNOOP.